US012454135B2

(12) United States Patent
Suzuki

(10) Patent No.: US 12,454,135 B2
(45) Date of Patent: Oct. 28, 2025

(54) FILTER UNIT, LIQUID EJECTING HEAD, AND LIQUID EJECTING APPARATUS

(71) Applicant: SEIKO EPSON CORPORATION, Tokyo (JP)

(72) Inventor: Shigeki Suzuki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 192 days.

(21) Appl. No.: 18/158,738

(22) Filed: Jan. 24, 2023

(65) Prior Publication Data

US 2023/0234369 A1 Jul. 27, 2023

(30) Foreign Application Priority Data

Jan. 25, 2022 (JP) ................................ 2022-009283

(51) Int. Cl.

| | |
|---|---|
| ***B41J 2/175*** | (2006.01) |
| ***B41J 2/14*** | (2006.01) |
| ***B41J 2/19*** | (2006.01) |

(52) U.S. Cl.

CPC .......... *B41J 2/17563* (2013.01); *B41J 2/175* (2013.01); *B41J 2/19* (2013.01); *B41J 2002/14403* (2013.01)

(58) Field of Classification Search

CPC . B41J 2/17563; B41J 2/175; B41J 2/19; B41J 2002/14403

See application file for complete search history.

(56) References Cited

U.S. PATENT DOCUMENTS

| | | | |
|---|---|---|---|
| 6,814,435 B1 | 11/2004 | Shimada et al. | |
| 10,449,775 B2 * | 10/2019 | Akahane | B41J 2/17563 |
| 10,967,647 B2 * | 4/2021 | Funada | B41J 2/19 |
| 2011/0181670 A1 | 7/2011 | Tsubaki | |
| 2019/0016148 A1 | 1/2019 | Akahane | |
| 2019/0210369 A1 | 7/2019 | Hamano | |
| 2020/0070538 A1 | 3/2020 | Funada et al. | |

FOREIGN PATENT DOCUMENTS

| | | |
|---|---|---|
| JP | H09216375 | 8/1997 |
| JP | 2011148224 | 8/2011 |
| JP | 2016155252 | 9/2016 |
| JP | 2016203614 | 12/2016 |
| JP | 2019014212 | 1/2019 |
| JP | 2020-032677 A | 3/2020 |
| WO | 18/008397 | 4/2019 |

* cited by examiner

*Primary Examiner* — Geoffrey S Mruk
(74) *Attorney, Agent, or Firm* — WORKMAN NYDEGGER

(57) ABSTRACT

A filter unit includes a filter through which a liquid passes, a filter chamber that is divided into an upstream chamber and a downstream chamber by the filter, an inflow passage through which a liquid flows into the upstream chamber, a first outflow passage through which a liquid flows out from the downstream chamber, and a second outflow passage through which a liquid flows out from the downstream chamber, a distance from the inflow passage to the first outflow passage is shorter than a distance from the inflow passage to the second outflow passage, and a passage resistance of the second outflow passage is lower than a passage resistance of the first outflow passage.

18 Claims, 11 Drawing Sheets

FILTER UNIT, LIQUID EJECTING HEAD, AND LIQUID EJECTING APPARATUS

The present application is based on, and claims priority from JP Application Serial Number 2022-009283, filed Jan. 25, 2022, the disclosure of which is hereby incorporated by reference herein in its entirety.

BACKGROUND

1. Technical Field

The present disclosure relates to a filter unit, a liquid ejecting head, and a liquid ejecting apparatus, and, in particular, to a filter unit in which ink circulates as a liquid, and to an ink jet recording head and a liquid ejecting apparatus that eject ink.

2. Related Art

A liquid ejecting apparatus represented by an ink jet recording apparatus such as an ink jet printer and plotter has a nozzle capable of ejecting a liquid, as liquid droplets, such as ink stored in a liquid storage such as a cartridge and a tank. A portion between the liquid storage and the nozzle is provided with a filter unit that has a passage including a filter chamber in which a filter is disposed.

In the filter unit, the filter chamber is divided into an upstream chamber and a downstream chamber by the filter, bubbles and foreign substances such as dust included in the liquid in the upstream chamber are removed by the filter, and the liquid is caused to flow into the downstream chamber. Such a filter unit is provided with an inflow passage through which a liquid flows into the upstream chamber of the filter chamber and an outflow passage through which a liquid flows out from the downstream chamber of the filter chamber.

For example, there is a case in which one inflow passage is provided in one end of a first space, which is the upstream chamber of the filter chamber, and two outflow passages are provided in a second space, which is the downstream chamber of the filter chamber (for example, see JP-A-2020-32677). With such a configuration, accumulation of bubbles included in the liquid can be suppressed.

In a configuration in which distances from an inflow passage to a plurality of outflow passages are different, stagnation of an ink flow occurs, and bubbles are likely to accumulate in an area far from the inflow passage of the upstream chamber. Therefore, for example, when various types of cleaning operation such as suction cleaning and pressure cleaning are performed, bubbles that accumulate in the area far from the inflow passage of the upstream chamber are likely to flow into the outflow passage far from the inflow passage. When bubbles flow into the outflow passage far from the inflow passage, the bubbles temporarily cause resistance, and the ink is less likely to be discharged.

For this reason, the ink in the filter chamber is positively discharged from the outflow passage near the inflow passage, and bubbles may not be able to be sufficiently discharged through the outflow passage far from the inflow passage. In addition, it may take a lot of time to discharge bubbles, and the amount of waste ink may increase.

Note that such a problem is not limited to existing in a filter unit in which ink flows and to an ink jet recording head and an ink jet recording apparatus that eject ink, and such a problem may also exist in a filter unit in which liquids other than ink flow and in a liquid ejecting head and a liquid ejecting apparatus that eject a liquid.

SUMMARY

According to an aspect of the present disclosure that solves the above-described problem, a filter unit includes a filter through which a liquid passes, a filter chamber that is divided into an upstream chamber and a downstream chamber by the filter, an inflow passage through which a liquid flows into the upstream chamber, a first outflow passage through which a liquid flows out from the downstream chamber, and a second outflow passage through which a liquid flows out from the downstream chamber, a distance from the inflow passage to the first outflow passage is shorter than a distance from the inflow passage to the second outflow passage, and a passage resistance of the second outflow passage is lower than a passage resistance of the first outflow passage.

According to another aspect of the present disclosure, a filter unit includes a filter through which a liquid passes, a filter chamber that is divided into an upstream chamber and a downstream chamber by the filter, an inflow passage through which a liquid flows into the upstream chamber, a first outflow passage through which a liquid flows out from the downstream chamber, and a second outflow passage through which a liquid flows out from the downstream chamber, a distance from the inflow passage to the first outflow passage is shorter than a distance from the inflow passage to the second outflow passage, and an area of an opening of the second outflow passage formed in the downstream chamber is larger than an area of an opening of the first outflow passage formed in the downstream chamber.

According to another aspect of the present disclosure, a liquid ejecting head includes the filter unit according to the above-described aspect, and a plurality of nozzles that ejects a liquid supplied from the filter unit.

According to another aspect of the present disclosure, a liquid ejecting apparatus includes the above-described liquid ejecting head, and a liquid storage that supplies a liquid to the filter unit.

DESCRIPTION OF EXEMPLARY EMBODIMENTS

Hereinafter, the present disclosure will be described in detail based on embodiments. Note that, the following description is a description for one aspect of the present disclosure, and the configuration of the present disclosure can be appropriately changed within the scope of the disclosure.

In addition, in each figure, X, Y, and Z represent three spatial axes orthogonal to each other. In the specification, directions along the axes are an X-axis, a Y-axis, and a Z-axis. In the description, the direction in which the arrow in each figure directs is a positive (+) direction, and the opposite direction of the arrow is a negative (−) direction. In addition, the three spatial axes of X, Y, and Z that do not limit a positive direction or a negative direction are described as an X-axis, a Y-axis, and a Z-axis. In addition, the Z-axis indicates a vertical direction (also referred to as the direction of gravity), the +Z direction indicates vertically downward, and the −Z direction indicates vertically upward.

First Embodiment

Figure 1:
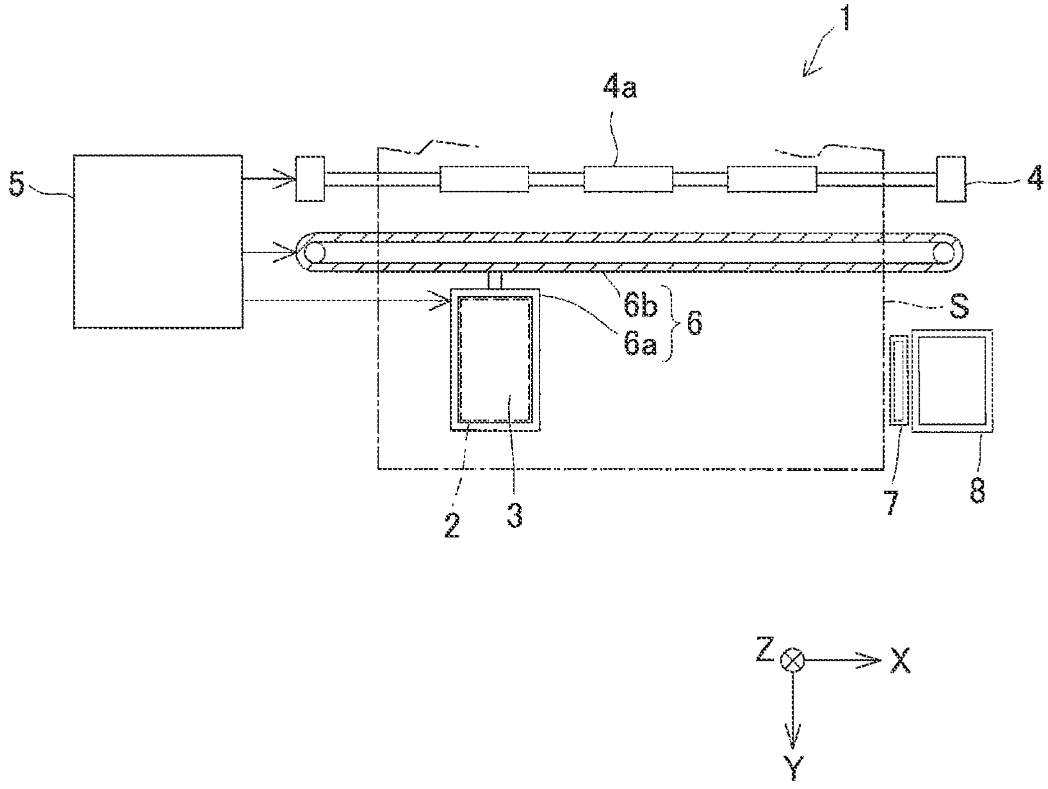
FIG. 1 is a view illustrating a schematic configuration of an ink jet recording apparatus according to a first embodiment.
Figure 2:
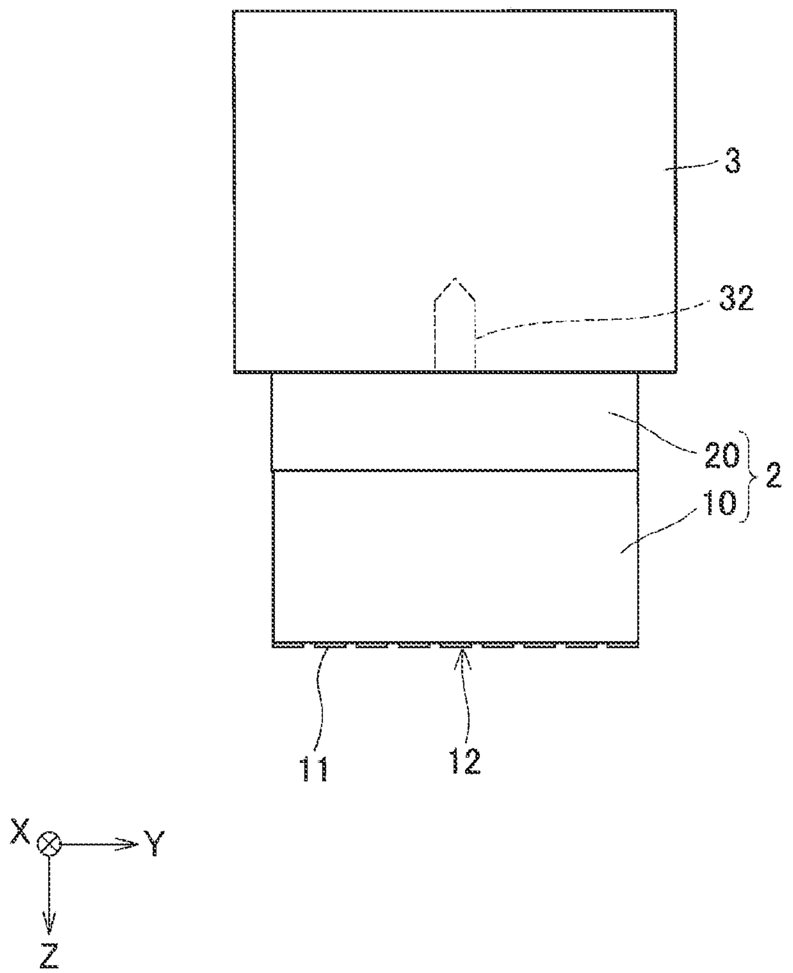
FIG. 2 is a view illustrating a schematic configuration of a recording head according to the first embodiment.

FIG. 1 is a view illustrating a schematic configuration of an ink jet recording apparatus 1 according to a first embodiment of the present disclosure. FIG. 2 is a view illustrating a schematic configuration of an ink jet recording head 2 and is a side view when viewed in the X-axis direction.

First, the entire configuration of the ink jet recording apparatus 1 according to the present embodiment will be described. As illustrated in FIG. 1, the ink jet recording apparatus 1, which is an example of a liquid ejecting apparatus of the present embodiment, is a printing apparatus that ejects and impacts ink, which is a kind of a liquid, as ink droplets on a medium S such as printing paper to perform printing of an image and the like by dot arrangement formed on the medium S. Note that as the medium S, in addition to recording paper, an appropriate material such as a resin film and a fabric can be used.

The ink jet recording apparatus 1 includes the ink jet recording head 2 (hereinafter, also simply referred to as a recording head 2), a cartridge 3, a transporting mechanism 4 that feeds the medium S, a control unit 5, which is a controller, and a moving mechanism 6.

The recording head 2 is an example of a liquid ejecting head, and, as illustrated in FIG. 2, has an ejecting surface 12 provided with a nozzle 11 on a surface facing the +Z direction. In addition, the recording head 2 is disposed such that the ejecting surface 12 extends in a direction of a horizontal plane orthogonal to the Z-axis or the vertical direction, that is, extends in a direction of an X-Y plane defined by the X-axis and the Y-axis.

As illustrated in FIG. 1, the moving mechanism 6 is controlled by the control unit 5 and reciprocates the recording head 2 in the +X direction and the −X direction of the X-axis. The +X direction and the −X direction in which the recording head 2 is reciprocated by the moving mechanism 6 are directions intersecting the −Y direction and the +Y direction in which the medium S is transported.

The moving mechanism 6 of the present embodiment includes a transporting body **6*a* and a transporting belt 6*b*. The transporting body 6*a* is a structure body having a substantially box shape accommodating the recording head 2, that is, a so-called carriage, and is fixed to the transporting belt 6*b*. The transporting belt 6*b* is an endless belt bridged along the X-axis. As the transporting belt 6*b* rotates under the control of the control unit 5, the recording head 2 is reciprocated in the X-axis direction together with the transporting body 6*a***.

The cartridge 3 is an example of a liquid storage that stores ink, which is a liquid supplied to the nozzle 11, and stores a respective kind of ink of a plurality of inks (for example, a plurality of colors) to be ejected from the recording head 2. The cartridge 3 is mounted on the transporting body **6*a* of the moving mechanism 6 together with the recording head 2, and the cartridge 3 can be detachably attached to the recording head 2**.

Note that the liquid storage is not limited to the cartridge 3, and examples include a bag-shaped ink pack formed of a flexible film, an ink tank that can be filled with ink, and the like. In addition, the liquid storage is not limited to be mounted on the transporting body **6*a*. Instead of being mounted on the transporting body 6*a*, the liquid storage may be fixed to an apparatus main body and be coupled to the recording head 2 through a passage such as a tube. Note that in the present embodiment, a plurality of the cartridges 3 corresponding to the plurality of kinds of ink having different colors and kinds is provided, but in FIGS. 1 and 2, the plurality of cartridges 3** is collectively illustrated as one.

The transporting mechanism 4 is an example of a transporting unit that is controlled by the control unit 5 and transports the medium S in the Y-axis direction, and has, for example, a transportation roller **4*a*. Note that the transporting mechanism 4 that transports the medium S is not limited to having the transportation roller 4*a*** and may have a belt or a drum that transports the medium S.

The control unit 5 includes, for example, a control apparatus such as a central processing unit (CPU) or a field programmable gate array (FPGA), and a storage apparatus such as a semiconductor memory. The control unit 5 comprehensively controls each element of the ink jet recording apparatus 1, that is, the transporting mechanism 4, the moving mechanism 6, the recording head 2, and the like as the control apparatus executes a program stored in the storage apparatus.

In the ink jet recording apparatus 1 described above, the recording head 2 executes recording operation of ejecting ink supplied from the cartridge 3 as ink droplets, which are liquid droplets, onto the medium S under the control of the control unit 5. From the recording head 2, the ink droplets are ejected in the +Z direction as described above. Then, when the medium S is transported in the Y-axis direction by the transporting mechanism 4, and the recording head 2 is transported in the X-axis direction by the moving mechanism 6 at the same time, the recording head 2 ejects the ink droplets onto the medium S, such that a desired image is formed on the X-Y plane of the medium S.

In addition, on one side in the X-axis direction, which is a moving direction of the recording head 2, that is, on the +X direction side in the present embodiment, a wiper 7 serving as a wiping member that wipes the ejecting surface 12 of the recording head 2 is disposed. The wiper 7 is formed of, for example, an elastic flexible member such as rubber or elastomer. In a wiping operation, while an edge portion of the wiper 7 is in contact with the ejecting surface 12, both the wiper 7 and the ejecting surface 12 move relatively to each other, such that the wiper 7 wipes the ejecting surface 12. Note that as a mechanism that wipes the ejecting surface 12, for example, various known configurations such as a mechanism in which a sheet-like wiper made of, for example, a nonwoven fabric performs wiping can be adopted.

Figure 5:
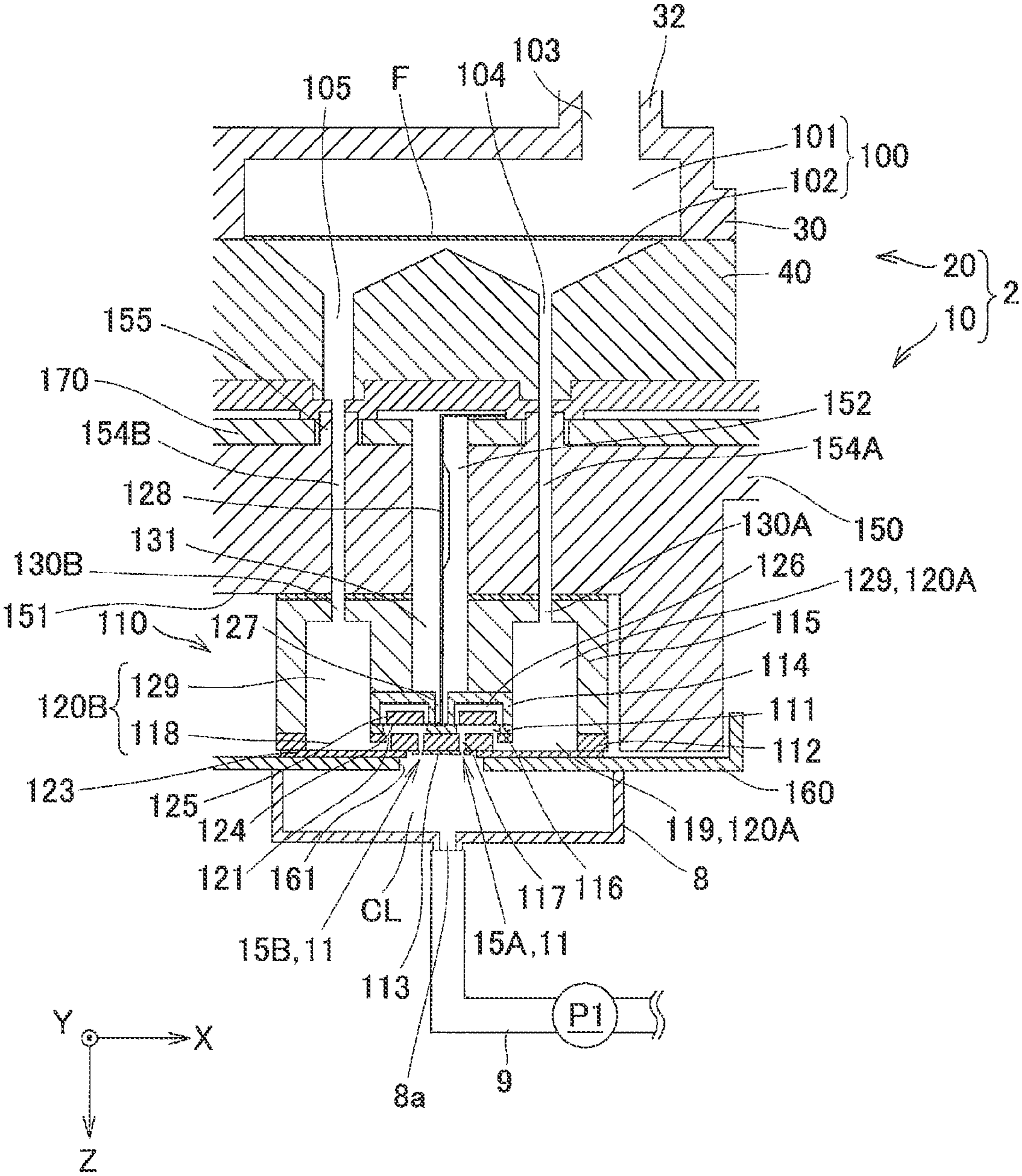
FIG. 5 is a sectional view of a liquid ejecting unit according to the first embodiment.

In addition, on the +X direction side, which is a standby position (also referred to as a home position) of the recording head 2, a cap 8 is disposed adjacent to the above-described wiper 7. As illustrated in FIG. 5, the cap 8 is formed into a tray shape that can come into contact with the ejecting surface 12 of the recording head 2. The cap 8 is configured to be capable of coming into close contact with the ejecting surface 12 while a plurality of the nozzles 11 of the recording head 2 faces an internal space.

More specifically, by coming into contact with the ejecting surface 12, the cap 8 forms a closed space CL in which the plurality of nozzles 11 forming a first nozzle line 15A described later and the plurality of nozzles 11 forming a second nozzle line 15B described later open. That is, the internal space of the cap 8 functions as a sealing hollow portion. In addition, a tube 9 that couples a waste liquid tank (not illustrated) with a discharge hole 8*a* formed on a bottom wall of the cap 8 is coupled to the cap 8. A pump P1 is provided in the middle of the tube 9.

In the recording apparatus 1, while the cap 8 is brought into close contact with the ejecting surface 12 of the recording head 2, for example, suction cleaning is performed at a prescribed timing. During the suction cleaning, as the inside of the cap 8 is made to have a negative pressure by driving of the pump P1 coupled to the cap 8, the ink in the recording head 2 is sucked, and the ink is discharged from each nozzle 11 into the cap 8.

In addition, in the recording apparatus 1, while the cap 8 is brought into close contact with or face the ejecting surface 12 of the recording head 2, for example, pressure cleaning can also be performed. During the pressure cleaning, as the ink in the recording head 2 is pressurized by a liquid pressurizing mechanism such as a diaphragm pump or a tube pump (not illustrated) disposed upstream of a filter chamber 100 described later, the ink is discharged into the cap 8 from each nozzle 11.

The recording head 2 of the present embodiment includes, as illustrated in FIG. 2, a liquid ejecting unit 10 that ejects a liquid and a filter unit 20.

A plurality of the filter units 20 corresponding to the number of the cartridges 3, that is, a plurality of kinds of ink having different colors and kinds, is provided. In FIG. 2, the plurality of filter units 20 is collectively illustrated as one. Needless to say, by dividing the same kind of ink, two or more filter units 20 can be provided for the same kind of ink.

The liquid ejecting unit 10 has the ejecting surface 12 on which the nozzle 11 that ejects ink, which is a liquid, as ink droplets opens on a surface facing the medium S, that is, a surface facing the +Z direction. In addition, the inside of the liquid ejecting unit 10 is provided with a passage in communication with the nozzle 11, a pressure generation unit that causes a pressure change of the ink in the passage, and the like. As the pressure generation unit, for example, a piezoelectric actuator can be used and causes a pressure change of the ink in the passage by changing the volume of the liquid passage by deformation of the piezoelectric actuator having a piezoelectric material that exhibits an electromechanical conversion function so as to discharge ink droplets from the nozzle 11. In addition, as the pressure generation unit, for example, a unit in which a heater element is disposed in a passage and a bubble is generated by heating of the heater element so as to eject ink droplets from the nozzle 11 can be used. Moreover, as the pressure generation unit, a so-called electrostatic actuator can be used and generates an electrostatic force between a vibration plate and an electrode and deforms the vibration plate by the electrostatic force so as to eject ink droplets from the nozzle 11.

The filter unit 20 is provided with a passage through which ink, which is a liquid, is supplied from each cartridge 3. The ink of the cartridge 3 is supplied to the liquid ejecting unit 10 through the passage of the filter unit 20.

Figure 3:
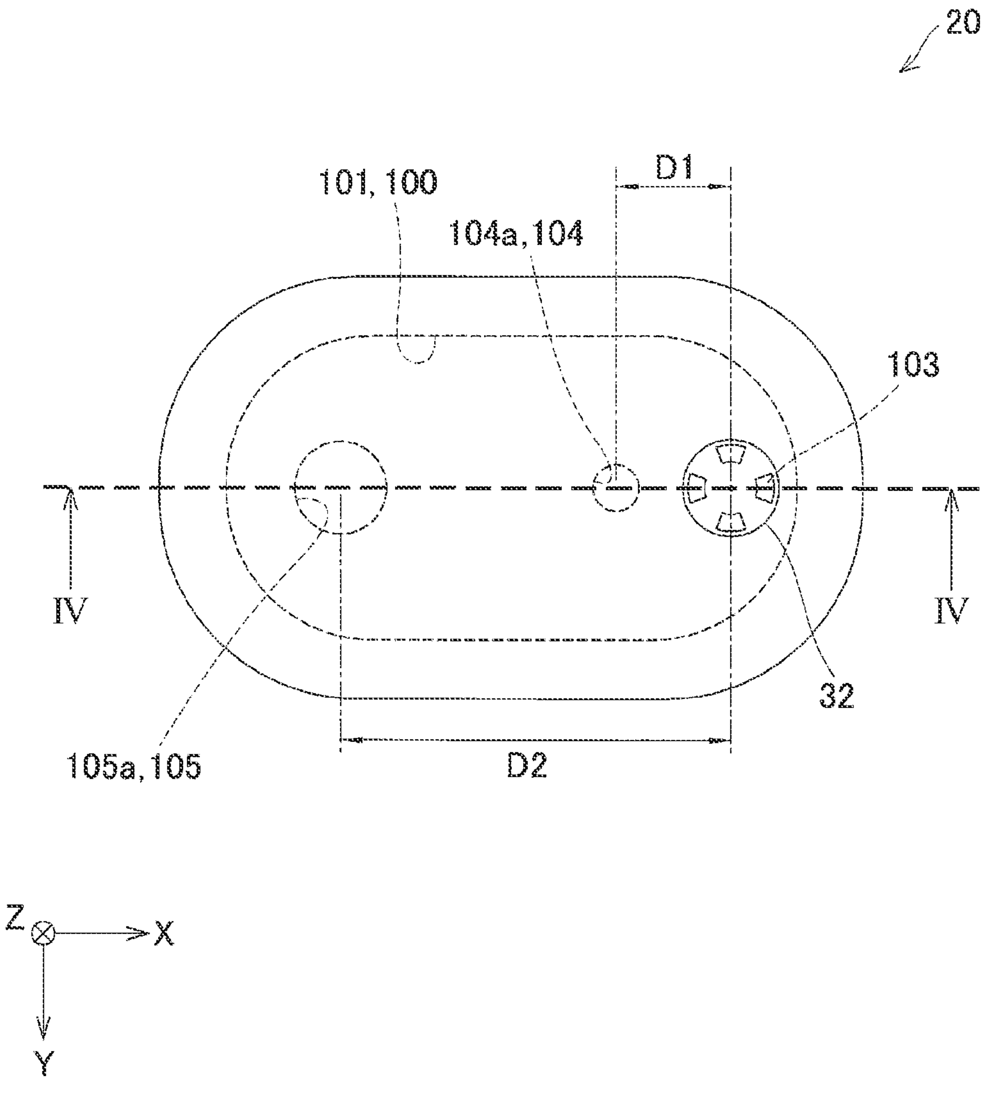
FIG. 3 is a plan view of a filter unit according to the first embodiment.
Figure 4:
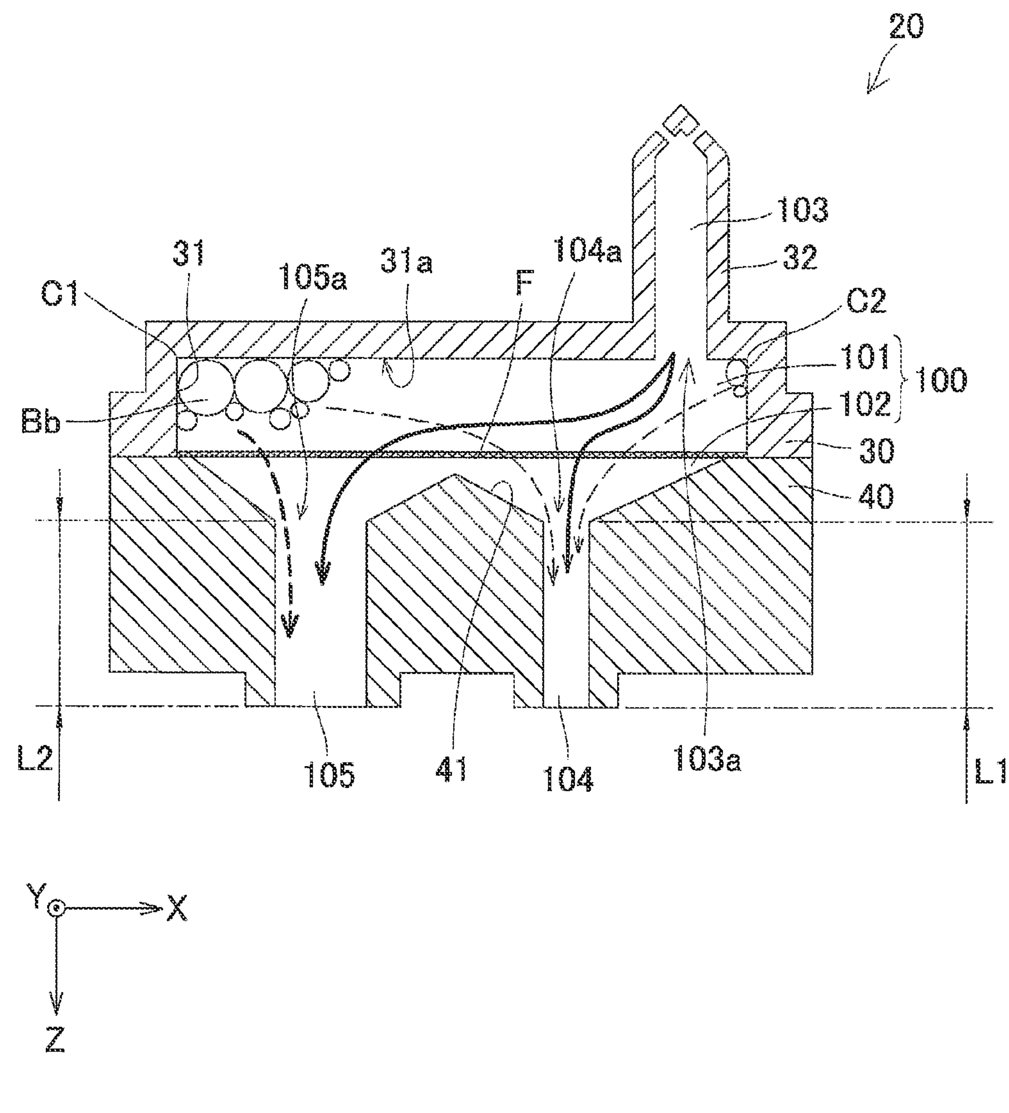
FIG. 4 is a sectional view of the filter unit according to the first embodiment.

FIG. 3 is a plan view of the filter unit 20 according to the first embodiment when viewed in the +Z direction. FIG. 4 is a sectional view cut along line IV-IV of FIG. 3. Note that the solid arrows in FIG. 4 indicate flows of the ink in an upstream chamber, and the dashed arrows indicate flows of bubbles when various types of cleaning operation and the like are performed.

As illustrated in FIGS. 3 and 4, the filter unit 20 includes a first passage member 30 and a second passage member 40. The first passage member 30 and the second passage member 40 are mutually laminated along the Z-axis, and the first passage member 30 is disposed in the −Z direction with respect to the second passage member 40.

The filter chamber 100 is defined between the first passage member 30 and the second passage member 40. The filter chamber 100 is formed by aligning an opening of a first recess 31 that is provided in the first passage member 30 and opens on a surface facing the +Z direction with an opening of a second recess 41 that is provided in the second passage member 40 and opens on a surface facing the −Z direction. That is, the filter chamber 100 is defined by the first recess 31 and the second recess 41.

A filter F is fixed to the opening portion of the second recess 41 of the second passage member 40. The filter F is disposed such that an in-plane direction of the main surface in which the filter F extends corresponds to a direction orthogonal to the +Z direction, which is a laminating direction of the first passage member 30 and the second passage member 40, that is, corresponds to a direction of the X-Y plane, which is a horizontal plane. That is, the direction in which the filter F extends is preferably substantially parallel to the horizontal plane. Note that being substantially parallel to the horizontal plane here includes a plane within ±10° from a plane parallel to the horizontal plane.

The filter F captures bubbles and foreign substances such as dust included in the ink, and, for example, a sheet-like filter in which a plurality of micropores is formed of finely weaved fibers of metal, resin, or the like can be used. In addition, for the filter F, a plate-like member of metal, resin, or the like provided with a plurality of fine through-holes can be used. Note that for the filter F, a nonwoven fabric and the like may be used, and the material thereof is not particularly limited. In addition, the method of fixing the filter F to the second passage member 40 is not particularly limited, and examples include adhesion by an adhesive, heat welding, and the like.

The filter chamber 100 is divided by the filter F into an upstream chamber 101 upstream of the filter F and a downstream chamber 102 downstream of the filter F. As illustrated in FIG. 3, the filter chamber 100 and the filter F have a so-called rounded rectangular shape (also referred to as a stadium shape) with each end portion in the longitudinal direction having a semicircular shape based on a rectangular shape whose longitudinal direction is the X-axis, when viewed in the +Z direction.

That is, the filter chamber 100 and the filter F has an elongated shape whose longitudinal direction is a direction of the X-axis and whose latitudinal direction is a direction of the Y-axis. Needless to say, the shape of the filter chamber 100 and the filter F viewed in the +Z direction is not particularly limited and may be, for example, a square, a rectangle, a parallelogram, a polygon, a fan shape, a circle, an elongated hole shape, or the like. Here, the elongated hole shape denotes an ellipse and a shape similar to an ellipse, such as a rounded rectangular shape, an egg shape, or an oval.

In addition, the filter unit 20 is provided with an inflow passage 103, a first outflow passage 104, and a second outflow passage 105 that are in communication with the filter chamber 100.

The inflow passage 103 is in communication with the upstream chamber 101 of the filter chamber 100 and supplies ink from the cartridge 3 to the upstream chamber 101. The inflow passage 103 is provided so as to penetrate the first passage member 30 along the Z-axis, and one end of the inflow passage 103 is provided so as to open at a tip of a coupling portion 32 provided to project from a surface of the first passage member 30 facing the −Z direction. The other end of the inflow passage 103 is provided so as to open on a ceiling surface 31*a* of the first recess 31 of the first passage member 30 that defines the upstream chamber 101. An inflow port 103*a*, which is an opening of the inflow passage 103 on the upstream chamber 101 side, is disposed in the +X direction from the center of the filter chamber 100 in the X-axis direction, in plan view of the filter chamber 100 viewed in the +Z direction.

Note that the coupling portion 32 is a supply needle in which the inflow passage 103 is provided and whose tip is formed into a pointed shape of a needle and is inserted into the cartridge 3. Needless to say, the coupling portion 32 is not limited to a supply needle and may be a supply tube to which a tube is coupled. In addition, without providing the coupling portion 32 projecting from the first passage member 30, the inflow port 103*a* may be provided as the inflow passage 103 passing through the ceiling surface 31*a* of the first passage member 30.

On the other hand, the first outflow passage 104 and the second outflow passage 105 are in communication with the downstream chamber 102 of the filter chamber 100 and supply ink in the filter chamber 100 to the outside, that is, in the present embodiment, the liquid ejecting unit 10.

Each of the first outflow passage 104 and the second outflow passage 105 is provided so as to penetrate the second passage member 40 along the Z-axis, one end opens on a surface of the second passage member 40 facing the +Z direction, and the other end opens on the bottom surface of the second recess 41 of the second passage member 40, that is, a surface of the second recess 41 facing the −Z direction.

A first outflow port 104*a*, which is an opening of the first outflow passage 104 on the downstream chamber 102 side is disposed in the +X direction from the center of the filter chamber 100 in a direction of the X-axis, in plan view of the filter chamber 100 viewed in the +Z direction. That is, the first outflow port 104*a* is disposed between the center of the filter F in the X-axis direction and the inflow port 103*a* in the X-axis direction.

A second outflow port 105*a*, which is an opening of the second outflow passage 105 on the downstream chamber 102 side is disposed in the −X direction from the center of the filter chamber 100 in a direction of the X-axis, in plan view of the filter chamber 100 viewed in the +Z direction. That is, the second outflow port 105*a* is disposed on a side opposite to the inflow port 103*a*, in the X-axis direction, with respect to the center of the filter F in the X-axis direction.

The ink flow in the upstream chamber 101 is mainly generated in the −X direction from the inflow port 103*a* toward the second outflow port 105*a*. In FIG. 4, the ink flow from the inflow port 103*a* toward the first outflow port 104*a* and the ink flow from the inflow port 103*a* toward the second outflow port 105*a* are indicated by the solid arrows. A flow direction, which is a direction of an ink flow in the upstream chamber 101 of the present embodiment, is a direction from the inflow port 103*a* toward the second outflow port 105*a* in a straight line between the center of the opening of the inflow port 103*a* and the center of the opening of the second outflow port 105*a* and is the −X direction. Note that, in actual use, the ink flow from the inflow port 103*a* toward the second outflow port 105*a* is generated not only on the straight line between the inflow port 103*a* and the second outflow port 105*a*, but also along a stream line expanding in the +Y direction and the −Y direction from the straight line as a center. Therefore, the ink flow in the upstream chamber 101 is generated over substantially the entire surface of the main surface of the filter F on the X-Y plane.

Therefore, in the filter unit 20 of the present embodiment, the first outflow passage 104 is disposed between the inflow passage 103 and the second outflow passage 105 in the flow direction in which the ink flows from the inflow passage 103 to the second outflow passage 105. That is, the first outflow port 104*a* is disposed between the inflow port 103*a* and the second outflow port 105*a* in the −X direction, which is the flow direction, when viewed in the Z-axis direction that is the laminating direction of the first passage member 30 and the second passage member 40 constituting the filter unit 20.

Here, when the first outflow port 104*a* is disposed between the inflow port 103*a* and the second outflow port 105*a* in the −X direction, this means that, in the X-Y plane viewed in the +Z direction, the coordinate in the X-axis of the first outflow port 104*a* is located at a position in the −X direction with respect to the coordinate in the X-axis of the inflow port 103*a*, including a case where the coordinate in the X-axis of the first outflow port 104*a* is the same as the coordinate in the X-axis of the inflow port 103*a*. In addition, the first outflow port 104*a* may be disposed at a position deviated in the +Y direction or the −Y direction with respect to the inflow port 103*a* and the second outflow port 105*a*. Note that the position of the inflow port 103*a* of the present embodiment indicates the center of the opening of the inflow port 103*a*, the position of the first outflow port 104*a* indicates the center of the first outflow port 104*a*, and the position of the second outflow port 105*a* indicates the center of the opening of the second outflow port 105*a*.

In addition, in order to improve the discharge performance of bubbles from the downstream chamber 102, the second recess 41 is provided such that the depth in the +Z direction gradually increases toward each of the first outflow port 104*a* and the second outflow port 105*a*, from the outer peripheral side of the filter F and from between the first outflow port 104*a* and the second outflow port 105*a*, and the bottom surface is inclined. In addition, in the present embodiment, the bottom surface of the second recess 41 between the first outflow port 104*a* and the second outflow port 105*a* is formed with a small gap from the surface of the filter F in the +Z direction, but may be formed so as to be in contact with the filter F.

As described above, in the filter unit 20, the first outflow passage 104 is provided between the inflow passage 103 and the second outflow passage 105 in the flow direction. Therefore, the distance from the inflow passage 103 to the first outflow passage 104 is different from the distance from the inflow passage 103 to the second outflow passage 105. For example, as illustrated in FIG. 3, a distance D1 from the inflow passage 103 to the first outflow passage 104 is shorter than a distance D2 from the inflow passage 103 to the second outflow passage 105.

In addition, in the present embodiment, a length L1 of the first outflow passage 104 and a length L2 of the second outflow passage 105 are the same. That is, the first outflow passage 104 and the second outflow passage 105 are formed so as to have substantially the same lengths.

In addition, a passage resistance of the second outflow passage 105 that is provided farther than the first outflow passage 104 from the inflow passage 103 is lower than a passage resistance of the first outflow passage 104. In particular, the passage resistance around the second outflow port 105*a* of the second outflow passage 105 is preferably lower than the passage resistance of the first outflow passage 104. Moreover, the overall passage resistance of the second outflow passage 105 is preferably lower than the overall passage resistance of the first outflow passage 104.

In the present embodiment, the area of the opening of the second outflow passage 105 formed in the downstream chamber 102, that is, the area of the second outflow port 105*a* is larger than the area of the opening of the first outflow passage 104 formed in the downstream chamber 102, that is, the area of the first outflow port 104*a*. The depth of the portion where the area of the second outflow port 105*a* is larger than that of the first outflow port 104*a* is preferably equal to or more than the diameter of the second outflow port 105*a*, and is more preferably two times or more. In the present embodiment, each of the first outflow passage 104 and the second outflow passage 105 is formed to have substantially the same inner diameter in a length direction thereof, and the depth of the portion where the area of the second outflow port 105*a* is larger than that of the first outflow port 104*a* is approximately twice the second outflow port 105*a*. As a result, the passage resistance of the second outflow passage 105 is lower than the passage resistance of the first outflow passage 104.

Here, the first outflow passage 104 and the second outflow passage 105 are basically passages formed in a member in which the downstream chamber 102 of the filter unit 20 is formed, which is the second passage member 40 in the present embodiment, but may include a passage formed in a member joined to the second passage member 40. In addition, the second passage member 40 does not necessarily have to be one part and may be, for example, a part in which a plurality of parts is integrated. In addition, the first outflow passage 104 and the second outflow passage 105 are passages configured with inner peripheral surfaces extending in a substantially vertical direction to a surface of the filter F. Note that being substantially vertical to a surface of the filter F here includes a range of approximately ±3° with respect to the direction vertical to the surface of the filter F.

Since the passage resistance of the second outflow passage 105 is lower than the passage resistance of the first outflow passage 104 as described above, for example, when various types of cleaning operation such as suction cleaning and pressure cleaning are performed, insufficiently discharging of a bubble Bb in the upstream chamber 101 through the second outflow passage 105 can be suppressed. This point will be described in detail with reference to FIG. 4.

As indicated by the solid arrows in FIG. 4, while recording operation is performed, the ink supplied from the cartridge 3 to the filter unit 20 flows from the inflow passage 103 to the first outflow passage 104, or flows from the inflow passage 103 to the second outflow passage 105. Therefore, the bubble Bb that flows into the upstream chamber 101 is likely to move in the −X direction by the ink flow from the inflow passage 103 toward the second outflow passage 105. In addition, since a buoyant force acts on the bubble Bb in the −Z direction, the bubble Bb is likely to move to a corner portion C1 of the upstream chamber 101 on the −X direction side and the −Z direction side. Moreover, in the corner portion C1, since the ink flow from the inflow passage 103 toward the second outflow passage 105 is less likely to be generated, stagnation is likely to occur, and the bubbles Bb are likely to accumulate. Note that in a corner portion C2 of the upstream chamber 101 on the +X direction side and the −Z direction side as well, since the ink flow from the inflow passage 103 toward the first outflow passage 104 is less likely to be generated, the bubbles Bb accumulate by a buoyant force. However, since stagnation is more likely to occur in the corner portion C1 than in the corner portion C2, the amount of the bubbles Bb that accumulate near the corner portion C2 is less than the amount of the bubbles Bb that accumulate near the corner portion C1.

As described above, in the upstream chamber 101, in a portion near the second outflow passage 105, which is far from the inflow passage 103, the bubbles Bb are likely to accumulate. When various types of cleaning operation and the like are performed in such a state, the bubbles Bb that have accumulated are likely to flow into the second outflow passage 105. That is, a large amount of the bubbles Bb that accumulate in the corner portion C1 are discharged mainly from the second outflow passage 105.

Here, a comparative example in which the passage resistance of the first outflow passage 104 and the passage resistance of the second outflow passage 105 are the same will be examined. In the comparative example, a time required for discharging the bubbles Bb that accumulate in the corner portion C2 from the first outflow passage 104 is shorter than a time required for discharging a large amount of the bubbles Bb that accumulate in the corner portion C1 from the second outflow passage 105. That is, the cleaning time for discharging the bubble Bb in the upstream chamber 101 through the first outflow passage 104 is shorter than the cleaning time for discharging the bubble Bb in the upstream chamber 101 through the second outflow passage 105. Therefore, after the cleaning time has elapsed for discharging the bubble Bb in the upstream chamber 101 through the first outflow passage 104 since the cleaning operation has started, while ink including a large amount of the bubbles Bb is discharged from the second outflow passage 105, mainly ink continues to be discharged from the first outflow passage 104, and thus the amount of waste ink increases.

On the other hand, in the present embodiment, since the passage resistance of the second outflow passage 105 is lower than the passage resistance of the first outflow passage 104, the amount of ink flowing through the second outflow passage 105 becomes larger than the amount of ink flowing through the first outflow passage 104. Therefore, compared to the comparative example, since a large amount of the bubbles Bb that accumulate near the corner portion C1 is easily discharged from the nozzle 11 of the liquid ejecting unit 10 to the outside through the second outflow passage 105, a possibility of staying of the bubbles Bb in the upstream chamber 101 after various types of cleaning operation are performed can be reduced. In addition, since the time for discharging a large amount of the bubbles Bb accumulating near the corner portion C1 from the nozzle 11 of the liquid ejecting unit 10 to the outside through the second outflow passage 105 can be reduced compared to the comparative example, the cleaning time can be reduced. As a result, the amount of ink to be discharged from the first outflow passage 104 through which mainly ink is likely to flow compared to the second outflow passage 105 can be reduced, and the amount of waste ink can be reduced.

In addition, as described above, the bubble Bb near the corner portion C1 is likely to flow into the second outflow port 105*a* than the first outflow port 104*a*. Therefore, when the area of the second outflow port 105*a* is the same as the area of the first outflow port 104*a*, the second outflow port 105*a* is likely to be temporarily blocked by the bubble Bb, the bubble Bb becomes the passage resistance of the second outflow passage 105, and the ink in the filter chamber 100 positively flows through the first outflow passage 104 having the first outflow port 104*a* that is less likely to be blocked by the bubble Bb. In particular, when the first nozzle line 15A in communication with the first outflow passage 104 and the second nozzle line 15B in communication with the second outflow passage 105 face the inside of the common closed space CL, negative pressure generated in the closed space CL by the pump P1 is likely to act on the first outflow passage 104 than on the second outflow passage 105, and thus the above-described phenomenon becomes more remarkable.

On the other hand, in the present embodiment, the area of the second outflow port 105*a* is larger than the area of the first outflow port 104*a*. Therefore, since the bubble Bb near the corner portion C1 is less likely to block the second outflow port 105*a*, likelihood of ink including the bubble Bb being discharged from the filter chamber 100 through the second outflow passage 105 can be increased, staying of the bubble Bb in the filter chamber 100 can be suppressed, and, in addition, the cleaning time and the amount of waste ink can be reduced.

Here, it is sufficient as long as the diameters of the first outflow port 104*a* and the second outflow port 105*a* are set such that the passage resistance of the second outflow passage 105 is lower than passage resistance of the first outflow passage 104, but the diameter of the second outflow port 105*a* is preferably, for example, equal to or more than 1 mm and equal to or less than 2 mm, and the diameter of the first outflow port 104*a* is preferably equal to or more than 0.5 mm and less than 1 mm.

Note that the configuration of the liquid ejecting unit 10 including a passage through which ink is supplied from the filter unit 20 is not particularly limited, and an existing configuration may be adopted. One example of such a configuration will be briefly described here. FIG. 5 is a sectional view illustrating a part of the liquid ejecting unit 10 according to the present embodiment in the X-axis direction.

The liquid ejecting unit 10 includes a head main body 110 including a plurality of the nozzles 11 and a holding member 150 in which the head main body 110 is fixed and a passage that couples the head main body 110 to the filter unit 20 is formed.

The head main body 110 includes a plurality of members such as a passage formation substrate 111, a communication plate 112, a nozzle plate 113 in which the nozzles 11 are formed, a protection substrate 114, and a case member 115, and the plurality of members is joined by an adhesive and the like to form the head main body 110.

In the passage formation substrate 111, a pressure chamber 116 in communication with each nozzle 11 is formed. Although not illustrated, a plurality of the pressure chambers 116 is provided in line in the Y-axis direction. That is, each of the plurality of pressure chambers 116 corresponding to each of the nozzles 11 provided in line is provided. In addition, in the passage formation substrate 111, a plurality of lines of the pressure chambers 116, which are provided in line in the Y-axis direction, is provided in the X-axis direction. In the present embodiment, two lines of the pressure chambers 116 are provided.

On a surface of the passage formation substrate 111 facing the +Z direction, the communication plate 112 and the nozzle plate 113 are joined. In the communication plate 112, a nozzle communication passage 117 is formed and causes each pressure chamber 116 to be in communication with a respective one of nozzles 11. In addition, in the communication plate 112, a first manifold portion 118 and a second manifold portion 119 are formed, and in addition, a supply communication passage 121 that couples the first manifold portion 118 and the second manifold portion 119 to each of the pressure chambers 116 provided in line is formed. Note that the first manifold portion 118 and the second manifold portion 119 form a manifold 120 for storing ink to be supplied to a plurality of the pressure chambers 116 together with a third manifold portion, described later, that is defined by the case member 115.

In the nozzle plate 113, a plurality of the nozzles 11 is provided in line in the Y-axis direction, and two nozzle lines 15 in which the plurality of nozzles 11 is provided in line in the Y-axis direction described above are provided in a corresponding manner to the lines of the pressure chambers 116. That is, in the nozzle plate 113, the first nozzle line 15A and the second nozzle line 15B are formed corresponding to the two lines of the pressure chambers 116.

Note that a compliance substrate 123 is joined to a surface of the communication plate 112 on which the first manifold portion 118 and the second manifold portion 119 open. By the compliance substrate 123, openings of the first manifold portion 118 and the second manifold portion 119 on the ejecting surface 12 side are sealed.

On a side of a surface opposite to the communication plate 112 of the passage formation substrate 111, a vibration plate 124 is provided. In addition, above the vibration plate 124, a piezoelectric actuator 125 is provided. The piezoelectric actuator 125 is an example of the above-described pressure generation unit and is formed of, for example, a piezoelectric material provided in a corresponding manner to each pressure chamber 116 and two electrodes provided so as to interpose the piezoelectric material therebetween. The piezoelectric material is displaced due to a potential difference generated between the two electrodes, the vibration plate is also displaced according to the displacement of the piezoelectric material, and a pressure change occurs in the ink in the pressure chamber 116, such that the ink is ejected from each nozzle 11. In addition, the protection substrate 114 having substantially the same size as the passage formation substrate 111 is joined to a surface of the passage formation substrate 111 on the piezoelectric actuator 125 side. The protection substrate 114 has a holding portion 126, which is a space for protecting and accommodating the piezoelectric actuator 125. In addition, the protection substrate 114 is provided with a through-hole 127 that penetrates in the Z-axis direction. Wiring of the piezoelectric actuator 125 is electrically coupled to a wiring member 128 on which a driving circuit such as a driving integrated circuit (IC) is mounted in the through-hole 127.

The case member 115 is fixed to a surface of the protection substrate 114 opposite to the passage formation substrate 111. The case member 115 is joined to the communication plate 112 together with the protection substrate 114. As a result, a third manifold portion 129 is defined by the case member 115 in the outer peripheral portion of the passage formation substrate 111. In addition, the first manifold portion 118 or the second manifold portion 119 provided on the communication plate 112, and the third manifold portion 129 form the manifold 120. Note that in the present embodiment, two manifolds 120 (120A and 120B) corresponding to the first nozzle line 15A and the second nozzle line 15B, respectively, are provided.

In the case member 115, an introduction passage 130 that is in communication with the manifold 120 and supplies ink to each manifold 120 is provided. In the present embodiment, since two independent manifolds 120 are provided in one head main body 110, the introduction passage 130 is provided for each manifold 120, that is, two introduction passages 130 are provided in total. Note that the case member 115 is provided with a coupling port 131 that is in communication with the through-hole 127 of the protection substrate 114 and through which the wiring member 128 is inserted.

The head main body 110 configured as described above is fixed to the holding member 150. That is, the head main body 110 is fixed on the +Z direction side of the holding member 150, and the filter unit 20 is fixed on the −Z direction side of the holding member 150.

Note that in the example of FIG. 5, only one head main body 110 is illustrated, but in actual use, a plurality of the head main bodies 110 is fixed to the holding member 150. However, the plurality of head main bodies 110 does not necessarily have to be fixed to the holding member 150, and needless to say, only one head main body 110 may be fixed to the holding member 150.

A head main body holding portion 151 having a recessed shape in which the head main body 110 is accommodated and held is provided on the +Z direction side of the holding member 150. In the head main body 110 accommodated in the head main body holding portion 151, a surface opposite to the ejecting surface 12 is fixed to the bottom surface of the head main body holding portion 151.

Note that on a surface of the holding member 150 on the head main body holding portion 151 side is provided with a cover head 160 that covers the opening of the head main body holding portion 151. The cover head 160 is formed of a plate-like member having an exposure opening portion 161 that exposes the ejecting surface 12 of the head main body 110.

On the −Z direction side of the holding member 150, that is, on the filter unit 20 side, a wiring substrate 170 is accommodated. In addition, the holding member 150 is provided with a wiring member insertion hole 152 through which the wiring member 128 is inserted. The wiring member 128 is coupled to the wiring substrate 170 while being inserted through the wiring member insertion hole 152.

In addition, in the holding member 150, a coupling passage 154 is provided and supplies the ink supplied from the filter unit 20 to the head main body 110. The coupling passage 154 is provided for each introduction passage 130 of the head main body 110. In the present embodiment, since two introduction passages 130 (130A and 130B) are provided in one head main body 110, two coupling passages 154 (154A and 154B) are provided in the holding member 150.

Specifically, in the head main body 110, the introduction passage 130A leading to the first nozzle line 15A and the introduction passage 130B leading to the second nozzle line 15B are formed. In addition, in the holding member 150, the coupling passage 154A that couples the first outflow passage 104 of the filter unit 20 to the introduction passage 130A and the coupling passage 154B that couples the second outflow passage 105 to the introduction passage 130B are provided.

Note that one end of each of the coupling passages 154A and 154B is provided and opens on an end surface of a first projection 155 projecting from the surface of the holding member 150. In addition, the other end of each of the coupling passages 154A and 154B is provided and opens on the bottom surface of the head main body holding portion 151. One end that opens on the end surface of the first projection 155 is coupled to the filter unit 20, and the other end that opens on the bottom surface of the head main body holding portion 151 is coupled to the introduction passage 130 of the head main body 110. As a result, the ink from the filter unit 20 is supplied to the head main body 110 through each of the coupling passages 154A and 154B. Specifically, the ink that flows out from the first outflow passage 104 of the filter unit 20 is supplied to the introduction passage 130A of the head main body 110 through the coupling passage 154A, and the ink that flows out from the second outflow passage 105 of the filter unit 20 is supplied to the introduction passage 130B of the head main body 110 through the coupling passage 154B.

As described above, according to the configuration of the recording head according to the present embodiment, when various types of cleaning operation and the like are performed, bubbles can be moved from each of the first outflow passage 104 and the second outflow passage 105 of the filter unit 20 toward the liquid ejecting unit 10, and the bubbles can be discharged from each of a plurality of the nozzles 11.

The filter unit 20 according to the present disclosure includes the filter F through which a liquid passes, the filter chamber 100 that is divided into the upstream chamber 101 and the downstream chamber 102 by the filter F, the inflow passage 103 through which a liquid flows into the upstream chamber 101, the first outflow passage 104 through which a liquid flows out from the downstream chamber 102, and the second outflow passage 105 through which a liquid flows out from the downstream chamber 102, and a distance from the inflow passage 103 to the first outflow passage 104 is shorter than a distance from the inflow passage 103 to the second outflow passage 105, and a passage resistance of the second outflow passage 105 is lower than a passage resistance of the first outflow passage 104.

In addition, the recording head 2, which is a liquid ejecting head according to the present disclosure, includes the filter unit 20, and the plurality of nozzles 11 that ejects a liquid supplied from the filter unit 20. More specifically, the recording head 2 includes the liquid ejecting unit 10 having the first nozzle line 15A formed of a part of the plurality of nozzles 11 and the second nozzle line 15B formed of a part of the plurality of nozzles 11 that is different from the first nozzle line 15A, a liquid is supplied to the first nozzle line 15A from the downstream chamber 102 through the first outflow passage 104, and a liquid is supplied to the second nozzle line 15B from the downstream chamber 102 through the second outflow passage 105.

In addition, the recording apparatus 1 according to the present disclosure includes the recording head 2, which is a liquid ejecting head, and a liquid storage 3 that supplies a liquid to the filter unit 20. Moreover, a direction in which the filter F extends in the recording apparatus 1 is preferably substantially parallel to the horizontal surface.

In the configurations described above, in any case, since the passage resistance of the second outflow passage 105 becomes small in the filter unit 20, the amount of ink flow of the second outflow passage 105 becomes large, and bubbles can be easily discharged from the second outflow passage 105. Moreover, since bubbles can be easily discharged, the cleaning time and the amount of waste ink can be reduced.

In addition, the area of the opening of the second outflow passage 105 formed in the downstream chamber 102 is preferably larger than the area of the opening of the first outflow passage 104 formed in the downstream chamber 102. As a result, the second outflow passage 105 is less likely to clog with bubbles, and thus bubbles can be effectively discharged from the second outflow passage 105.

In addition, the diameter of the opening of the second outflow passage 105 is preferably equal to or more than 1 mm and equal to or less than 2 mm, and the diameter of the opening of the first outflow passage 104 is preferably equal to or more than 0.5 mm and less than 1 mm. By optimizing the size of the opening of the second outflow passage 105 according to the size of the bubbles, the gas discharge performance can be improved.

In addition, the first outflow passage 104 is preferably disposed between the inflow passage 103 and the second outflow passage 105 in a flow direction in which a liquid flows from the inflow passage 103 toward the second outflow passage 105. Since the bubble Bb is likely to accumulate near the second outflow passage 105 of the upstream chamber 101, by having such a configuration, more remarkable effects can be obtained.

Second Embodiment

Figure 6:
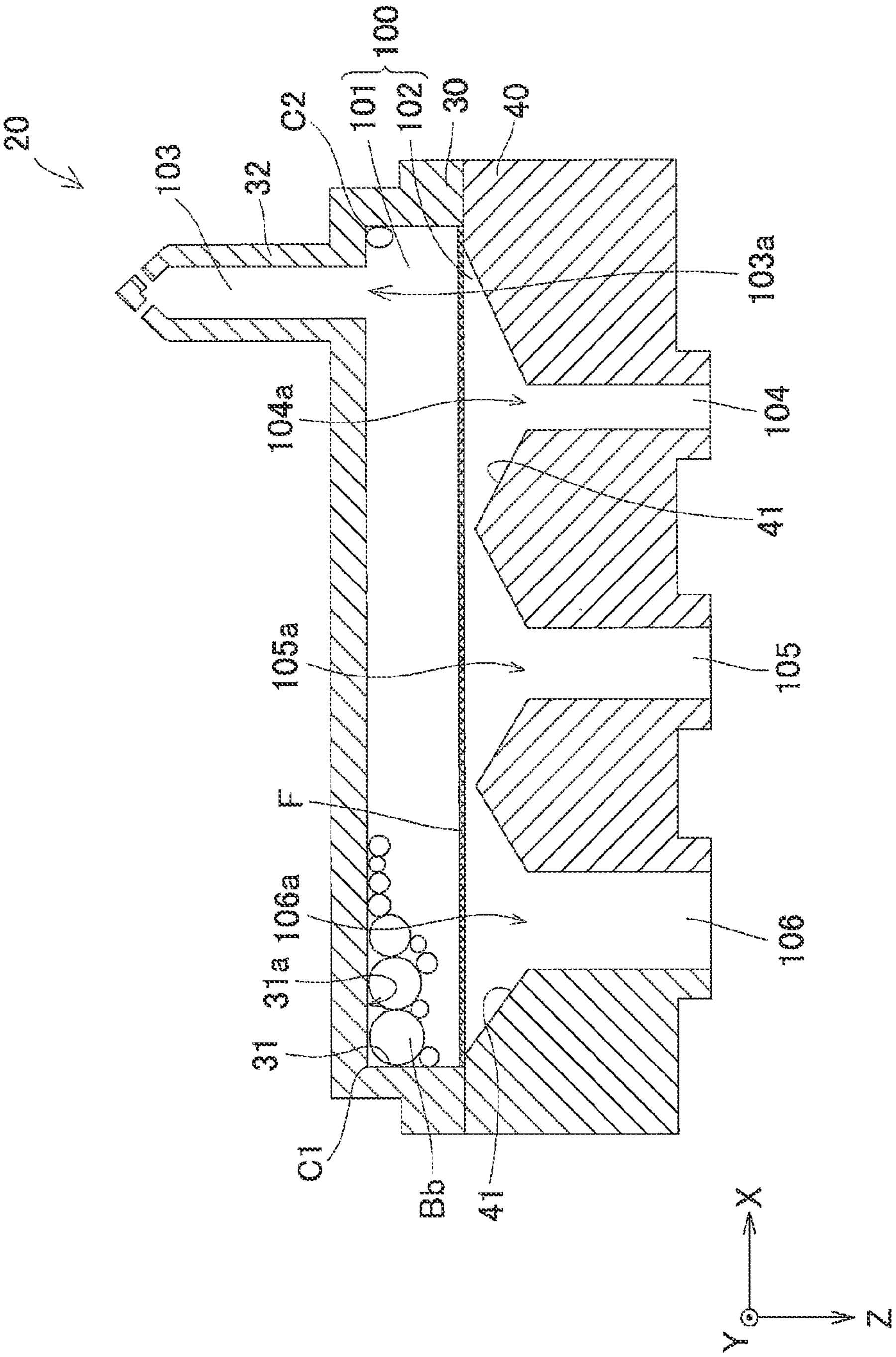
FIG. 6 is a sectional view of a filter unit according to a second embodiment.

FIG. 6 is a sectional view of a filter unit according to a second embodiment of the present disclosure. Note that the same members as the above-described embodiment will be denoted by the same reference signs, and redundant descriptions will be omitted.

As illustrated in FIG. 6, in the filter unit 20 according to the present embodiment, in addition to the first outflow passage 104 and the second outflow passage 105 in communication with the downstream chamber 102, a third outflow passage 106 is further provided.

The third outflow passage 106 is disposed in the −X direction, with respect to the second outflow passage 105, which is a flow direction of the ink flowing through the upstream chamber 101. That is, a third outflow port 106*a*, which is an opening of the third outflow passage 106 to the downstream chamber 102, is disposed in the −X direction from the second outflow port 105*a*.

Here, when the third outflow port 106*a* is disposed in the −X direction from the second outflow port 105*a*, this means that, in the X-Y plane viewed in the +Z direction, the coordinate in the X-axis of the third outflow port 106*a* is located at a position in the −X direction from the coordinate in the X-axis of the second outflow port 105*a*. That is, the third outflow port 106*a* that is disposed at a position deviated in the +Y direction or the −Y direction with respect to the second outflow port 105*a* is also included. Note that the position of the third outflow port 106*a* indicates the center of the opening of the third outflow port 106*a*, the position of the second outflow port 105*a* indicates the center of the opening of the second outflow port 105*a*.

In addition, the passage resistance of the second outflow passage 105 that is provided farther than the first outflow passage 104 from the inflow passage 103 is lower than the passage resistance of the first outflow passage 104, similar to the first embodiment. The passage resistance of the third outflow passage 106 that is provided farther than the second outflow passage 105 from the inflow passage 103 is lower than the passage resistance of the second outflow passage 105. In particular, the passage resistance around the third outflow port 106*a* of the third outflow passage 106 is preferably lower than the passage resistance of the second outflow passage 105. Moreover, the overall passage resistance of the third outflow passage 106 is preferably lower than the overall passage resistance of the second outflow passage 105.

In the present embodiment, the area of the opening of the third outflow passage 106 formed in the downstream chamber 102, that is, the area of the third outflow port 106*a* is larger than the area of the opening of the second outflow passage 105 formed in the downstream chamber 102, that is, the area of the second outflow port 105*a*. The depth of the portion where the area of the third outflow port 106*a* is larger than that of the second outflow port 105*a* is preferably equal to or more than the diameter of the third outflow port 106*a*, and is more preferably two times or more. In the present embodiment, each of the first outflow passage 104, the second outflow passage 105, and the third outflow passage 106 is formed to have substantially the same inner diameter in a length direction thereof, and the depth of the portion where the area of the third outflow port 106*a* is larger than that of the second outflow port 105*a* is approximately twice the third outflow port 106*a*. As a result, the passage resistance of the third outflow passage 106 is lower than the passage resistance of the second outflow passage 105.

As described above, in the present embodiment, the third outflow passage 106 through which a liquid flows out from the downstream chamber 102 is further included, the distance from the inflow passage 103 to the second outflow passage 105 is shorter than the distance from the inflow passage 103 to the third outflow passage 106, and the size of the opening of the third outflow passage 106 formed in the downstream chamber 102 is larger than the size of the opening of the second outflow passage 105. Furthermore, the size of the opening of the second outflow passage 105 is larger than the size of the opening of the first outflow passage 104.

In addition, in the present embodiment, the third outflow passage 106 through which a liquid flows out from the downstream chamber 102 is further included, the distance from the inflow passage 103 to the second outflow passage 105 is shorter than the distance from the inflow passage 103 to the third outflow passage 106, and the passage resistance of the third outflow passage 106 is lower than the passage resistance of the second outflow passage 105. Furthermore, the passage resistance of the second outflow passage 105 is lower than the passage resistance of the first outflow passage 104.

When various types of cleaning operation are performed, a large amount of the bubbles Bb that accumulate near the corner portion C1 is most likely to flow into each outflow passage of the third outflow passage 106, the second outflow passage 105, and the first outflow passage 104 in this order. However, since the passage resistance is the smallest in the order of the third outflow passage 106, the second outflow passage 105, and the first outflow passage 104, the same effects of the first embodiment can be obtained. In addition, since the area of the opening is the largest in the order of the third outflow port 106*a*, the second outflow port 105*a*, and the first outflow port 104*a*, the same effects as the first embodiment can be obtained.

Note that in the present embodiment, the passage resistance of the second outflow passage 105 is lower than the passage resistance of the first outflow passage 104, but the passage resistance of the second outflow passage 105 may be the same as the passage resistance of the first outflow passage 104. That is, only the passage resistance of the third outflow passage 106 may be lower than the passage resistances of other outflow passages.

In addition, in the present embodiment, a configuration in which the filter unit 20 includes the first outflow passage 104, the second outflow passage 105, and the third outflow passage 106 is exemplified, but the configuration of the filter unit 20 is not particularly limited, and for example, a configuration in which the filter unit 20 further includes a fourth outflow passage that is disposed in the −X direction of the third outflow passage 106 may be adopted.

In this case as well, by setting the size of the opening of the fourth outflow passage formed in the downstream chamber 102 to be larger than the size of the opening of the third outflow passage 106 and, in addition, setting the passage resistance of the fourth outflow passage to be lower than the passage resistance of the third outflow passage 106, the same effects as the present embodiment can be obtained.

Third Embodiment

Figure 7:
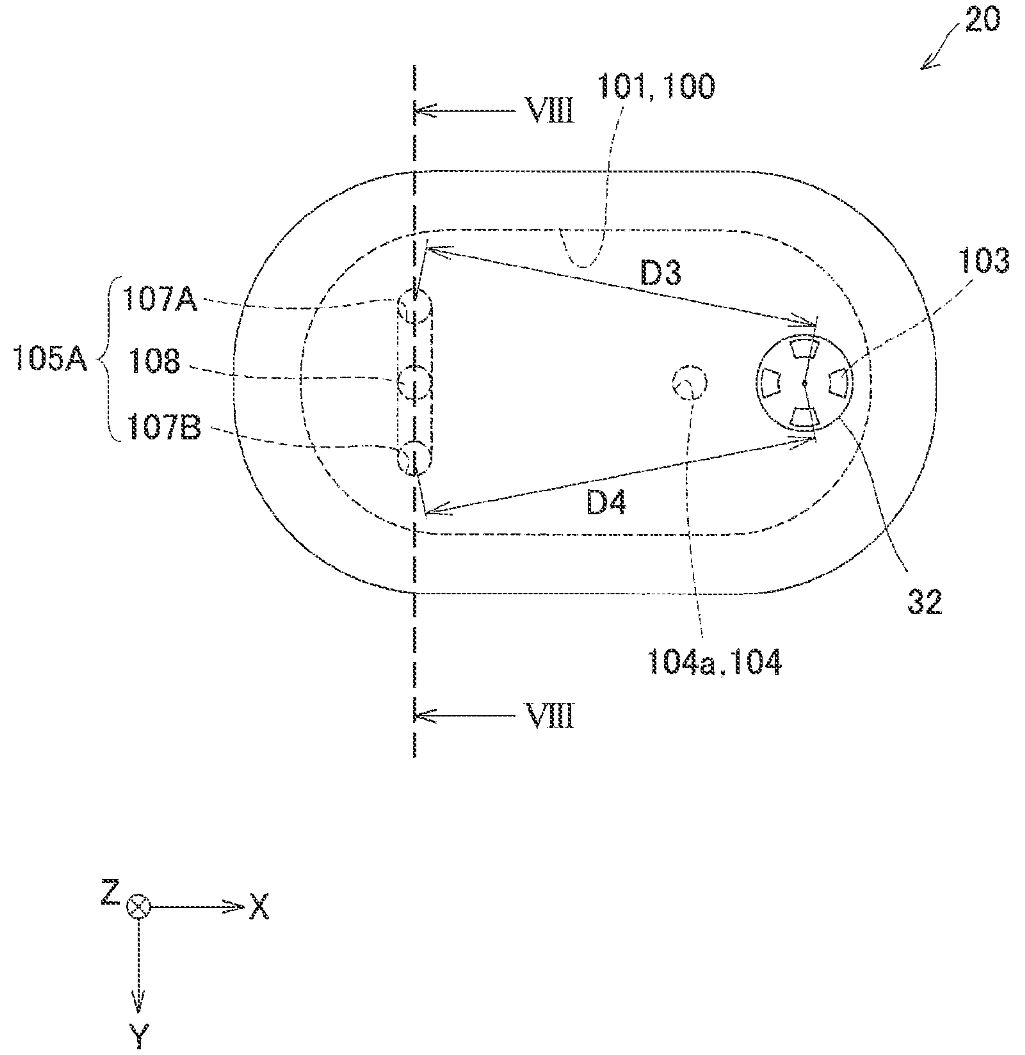
FIG. 7 is a plan view of a filter unit according to a third embodiment.
Figure 8:
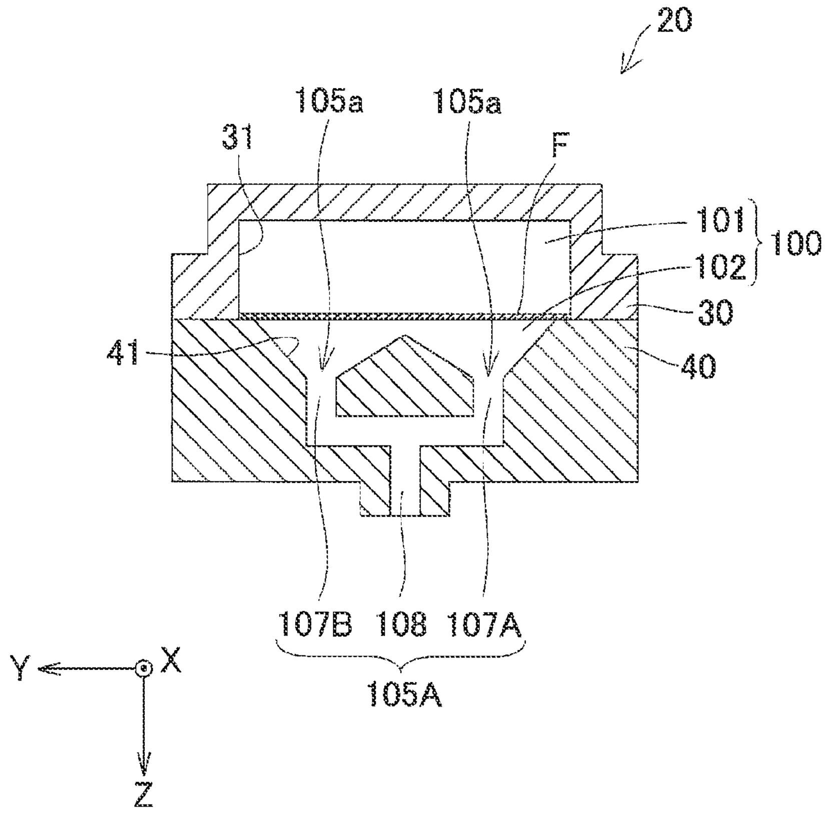
FIG. 8 is a sectional view of the filter unit according to the third embodiment.

FIG. 7 is a plan view of a filter unit according to a third embodiment of the present disclosure when viewed in the +Z direction, and FIG. 8 is a sectional view cut along line VIII-VIII of FIG. 7. Note that the same members as the above-described embodiment will be denoted by the same reference signs, and redundant descriptions will be omitted.

The present embodiment is a modification of the second outflow passage 105, and other configurations are the same as the first embodiment. Specifically, as illustrated in FIGS. 7 and 8, the number of the second outflow ports 105*a*, which are openings, formed in the downstream chamber 102, of a second outflow passage 105A included in the filter unit 20, is greater than the number of the first outflow port 104*a*, which is an opening of the first outflow passage 104 formed in the downstream chamber 102. Specifically, the second outflow passage 105A is configured with two branch passages 107A and 107B that open in the downstream chamber 102 and a joining passage 108 where the branch passages 107A and 107B join together. That is, in the filter unit 20 of the present embodiment, while one first outflow port 104*a* is provided, two second outflow ports 105*a* are provided.

In addition, in the configuration as well, the passage resistance of the second outflow passage 105A is lower than the passage resistance of the first outflow passage 104. Moreover, the total area of the second outflow ports 105*a* is larger than the area of the first outflow port 104*a*.

As described above, in the present embodiment, the number of the openings of the second outflow passage 105A formed in the downstream chamber 102 is greater than the number of the opening of the first outflow passage 104 formed in the downstream chamber 102. In addition, the distance from the inflow passage 103 to each opening of the second outflow passage 105A is the same. Moreover, the second outflow passage 105A has a plurality of the branch passages 107A and 107B that open in the downstream chamber 102 and the joining passage 108 where the plurality of branch passages 107A and 107B join together.

With such a configuration as well, similar to the above-described embodiment, the amount of ink flow of the second outflow passage 105A becomes large, and bubbles can be easily discharged from the second outflow passage 105A. In addition, since bubbles can be easily discharged, the cleaning time and the amount of waste ink can be reduced.

In addition, the branch passages 107A and 107B are disposed such that a distance D3 from the inflow passage 103 to the second outflow port 105*a* of the branch passage 107A and a distance D4 from the inflow passage 103 to the second outflow port 105*a* of the branch passage 107B are the same. With such a configuration, a variation is less likely to occur in easiness of discharging of the bubble Bb from the second outflow port 105*a* of the branch passage 107A and easiness of discharging of the bubble Bb from the second outflow port 105*a* of the branch passage 107B. In addition, when the distance D3 and the distance D4 are the same, it is preferable that the passage resistance of the branch passage 107A and the passage resistance of the branch passage 107B are the same. Moreover, when the distance D3 and the distance D4 are the same, it is preferable that the area of the opening of the second outflow port 105*a* of the branch passage 107A and the area of the opening of the second outflow port 105*a* of the branch passage 107B are the same.

Note that the size of the opening of each second outflow port 105*a* is not particularly limited, but is preferably approximately the same as or larger than the first outflow port 104*a*. As a result, the amount of ink flow of the second outflow passage 105A can be appropriately increased.

Fourth Embodiment

Figure 9:
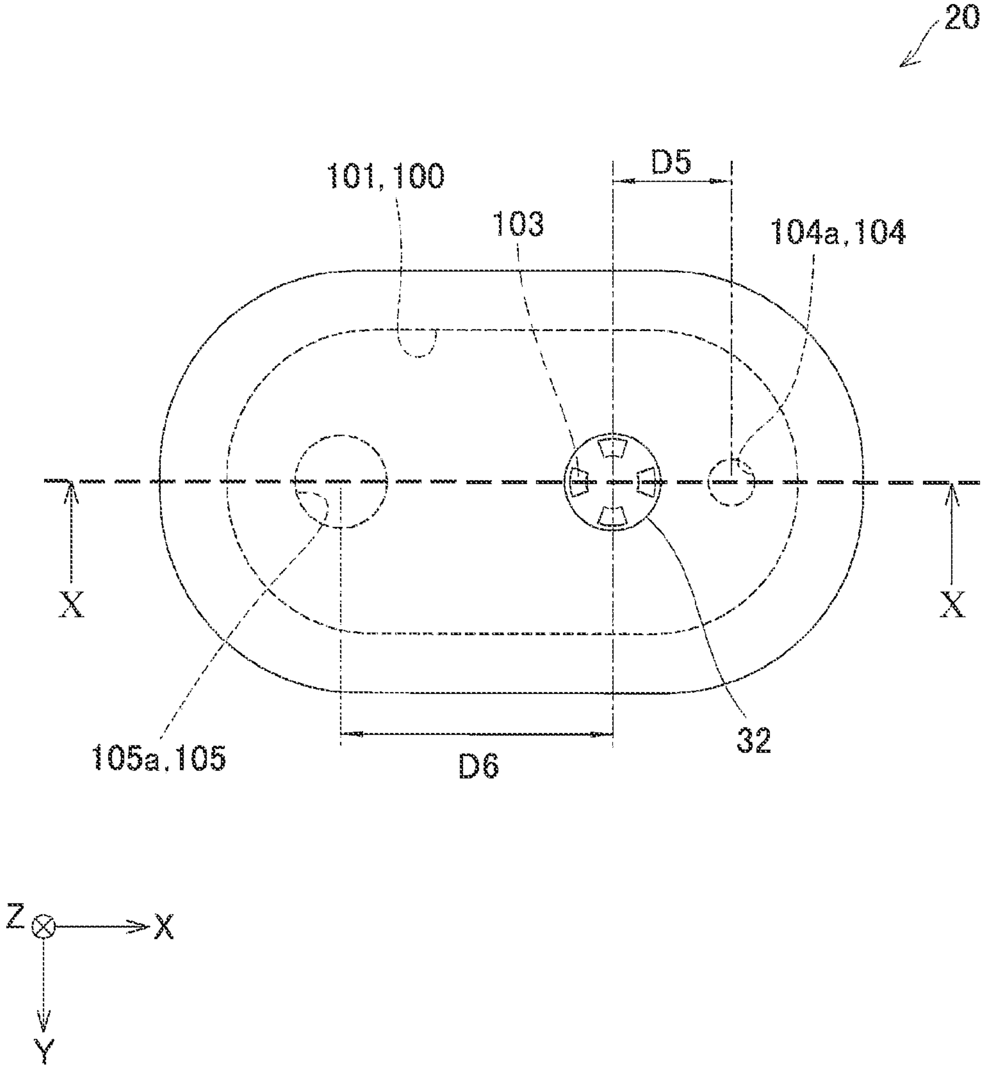
FIG. 9 is a plan view of a filter unit according to a fourth embodiment.
Figure 10:
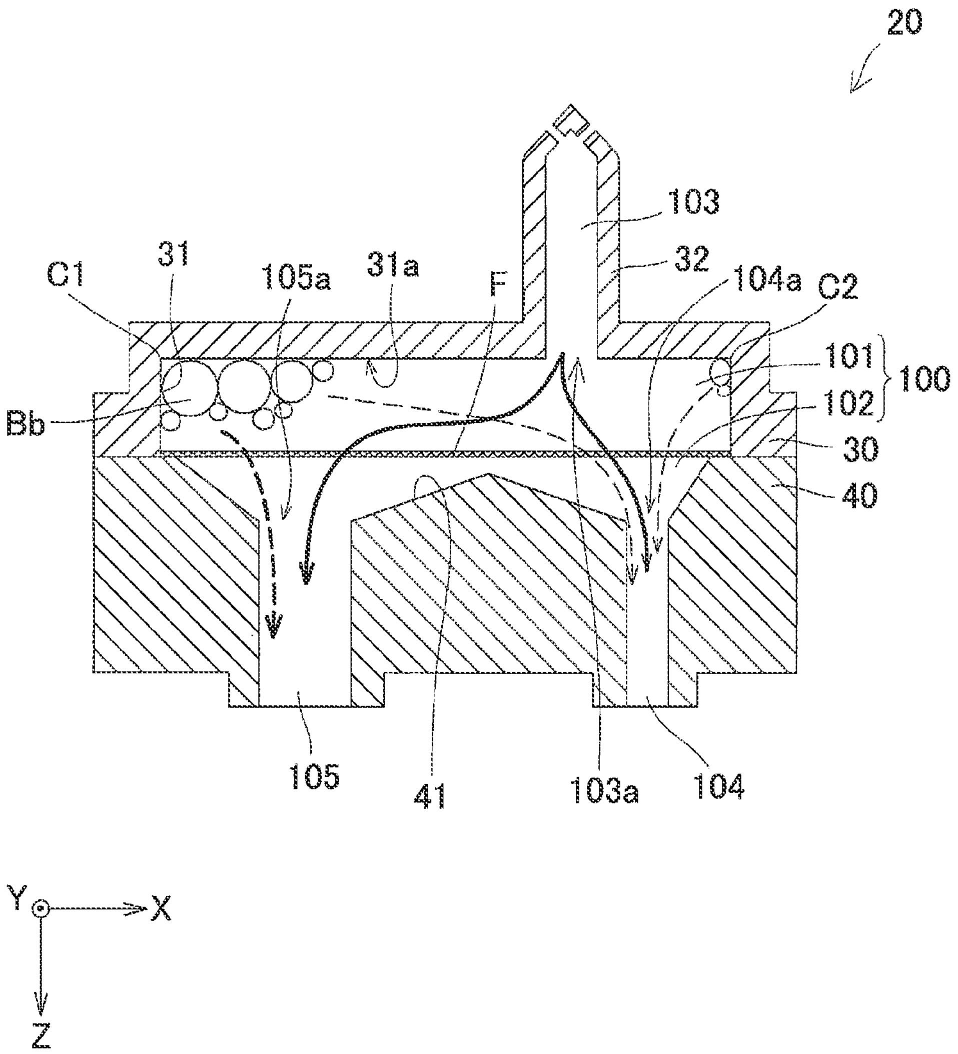
FIG. 10 is a sectional view of the filter unit according to the fourth embodiment.

FIG. 9 is a plan view of a filter unit according to a fourth embodiment of the present disclosure when viewed in the +Z direction, and FIG. 10 is a sectional view cut along line X-X of FIG. 9. Note that the same members as the above-described embodiment will be denoted by the same reference signs, and redundant descriptions will be omitted. In addition, the solid arrows in FIG. 10 indicate flows of the ink in the upstream chamber 101, and the dashed arrows indicate flows of bubbles when various types of cleaning operation and the like are performed.

The filter unit 20 according to the present embodiment has the same configuration as the first embodiment except for a change in dispositions of the inflow passage 103, the first outflow passage 104, and the second outflow passage 105. Specifically, as illustrated in FIGS. 9 and 10, the inflow port 103*a* of the inflow passage 103 is disposed in the +X direction from the center of the filter chamber 100 in the X-axis direction in plan view of the filter chamber 100 viewed in the +Z direction, but is disposed in the −X direction from the first outflow port 104*a* of the first outflow passage 104. In other words, the first outflow port 104*a* of the first outflow passage 104 is disposed in the +X direction from the inflow port 103*a* in plan view of the filter chamber 100 viewed in the +Z direction.

The second outflow port 105*a* of the second outflow passage 105 is disposed in the −X direction from the center of the filter chamber 100 in a direction of the X-axis in plan view of the filter chamber 100 viewed in the +Z direction. In addition, a distance D5 from the inflow passage 103 to the first outflow passage 104 is shorter than a distance D6 from the inflow passage 103 to the second outflow passage 105.

In addition, in the filter unit 20 according to the present embodiment as well, similar to the above-described embodiment, the passage resistance of the second outflow passage 105 is lower than the passage resistance of the first outflow passage 104. As a result, when various types of cleaning operation are performed, incapability of sufficiently discharging the bubble Bb in the upstream chamber 101 through the second outflow passage 105 can be suppressed.

As indicated by the solid arrows in FIG. 10, while recording operation is performed, the ink supplied from the cartridge 3 to the filter unit 20 flows in the +X direction from the inflow passage 103 toward the first outflow passage 104, and at the same time, flows in the −X direction toward the second outflow passage 105. Therefore, the bubble Bb that flows into the upstream chamber 101 moves in the +X direction by the flow from the inflow passage 103 toward the first outflow passage 104 and, at the same time, moves in the −X direction by the flow from the inflow passage 103 toward the second outflow passage 105. Therefore, the bubble Bb stays in each of the corner portions C1 and C2.

However, as described in the first embodiment, in the upstream chamber 101, in a portion near the second outflow passage 105, which is far from the inflow passage 103, in particular, near the corner portion C1, the ink flow from the inflow passage 103 toward the second outflow passage 105 is less likely to be generated, and stagnation is more likely to occur than the corner portion C2. Therefore, the bubble Bb is more likely to accumulate in the corner portion C1 than the corner portion C2.

When various types of cleaning operation and the like are performed, the bubble Bb that stays near the corner portion C1 is discharged mainly from second outflow passage 105. In the present embodiment, since the passage resistance of the second outflow passage 105 is lower than the passage resistance of the first outflow passage 104, the amount of ink flowing through the second outflow passage 105 becomes larger than the amount of ink flowing through the first outflow passage 104. Therefore, since a large amount of the bubbles Bb that accumulate near the corner portion C1 is easily discharged from the nozzle 11 of the liquid ejecting unit 10 to the outside through the second outflow passage 105, a possibility of staying of a large amount of the bubbles Bb in the upstream chamber 101 after various types of cleaning operation are performed can be reduced. Moreover, since bubbles are easily discharged, the cleaning time and the amount of waste ink can be reduced.

Other Embodiments

Each embodiment of the present disclosure has been described above, but the basic configuration of the present disclosure is not limited to the above-described configuration.

In addition, for example, in the above-described embodiment, an example in which the passage resistance of the second outflow passage in the filter unit is lower than the passage resistance of the first outflow passage has been described, but the filter unit of the present disclosure is not limited to the configuration. For example, in the filter unit of the present disclosure, as long as the area of the opening formed in the second outflow passage is larger than the area of the opening of the first outflow passage formed in the downstream chamber, the passage resistance of the second outflow passage does not necessarily have to be lower than the passage resistance of the first outflow passage. By setting the area of the opening formed in the second outflow passage to be large so that the flow rate of the liquid flowing through the second outflow passage sufficiently increases, even when the passage resistance of the second outflow passage is larger than the passage resistance of the first outflow passage, the same effects as the above-described embodiment can be obtained.

In addition, in each embodiment described above, a configuration in which the filter unit 20 is provided such that the flow direction of the ink is the X-axis direction is exemplified, but disposition of the filter unit 20 is not particularly limited. The filter unit 20 may be disposed, for example, such that the flow direction of the ink is the Y-axis direction.

In the above-described embodiment, the filter F is disposed such that the extending direction is substantially parallel to the horizontal plane, but as long as the first outflow port 104*a* is not located above the second outflow port 105*a* in the direction of gravity, the filter F may be disposed so as to intersect the horizontal plane.

In the above-described first embodiment, the first nozzle line 15A in communication with the first outflow passage 104 and the second nozzle line 15B in communication with the second outflow passage 105 are provided in the same head main body 110, but the first nozzle line 15A and the second nozzle line 15B do not necessarily have to be provided in the same head main body 110. For example, among a plurality of the head main bodies 110 included in the liquid ejecting unit 10, the first nozzle line 15A may be provided in one of two different head main bodies 110, and the second nozzle line 15B may be provided in another one of the head main bodies 110.

In the abode-described embodiment, the recording head 2 that performs cleaning operation such as suction cleaning and pressure cleaning is exemplified, but the recording head 2 may perform, for example, so-called circulation cleaning that circulates ink between a passage inside the recording head 2 and a passage outside the recording head 2 to remove impurities and bubbles in the ink.

Figure 11:
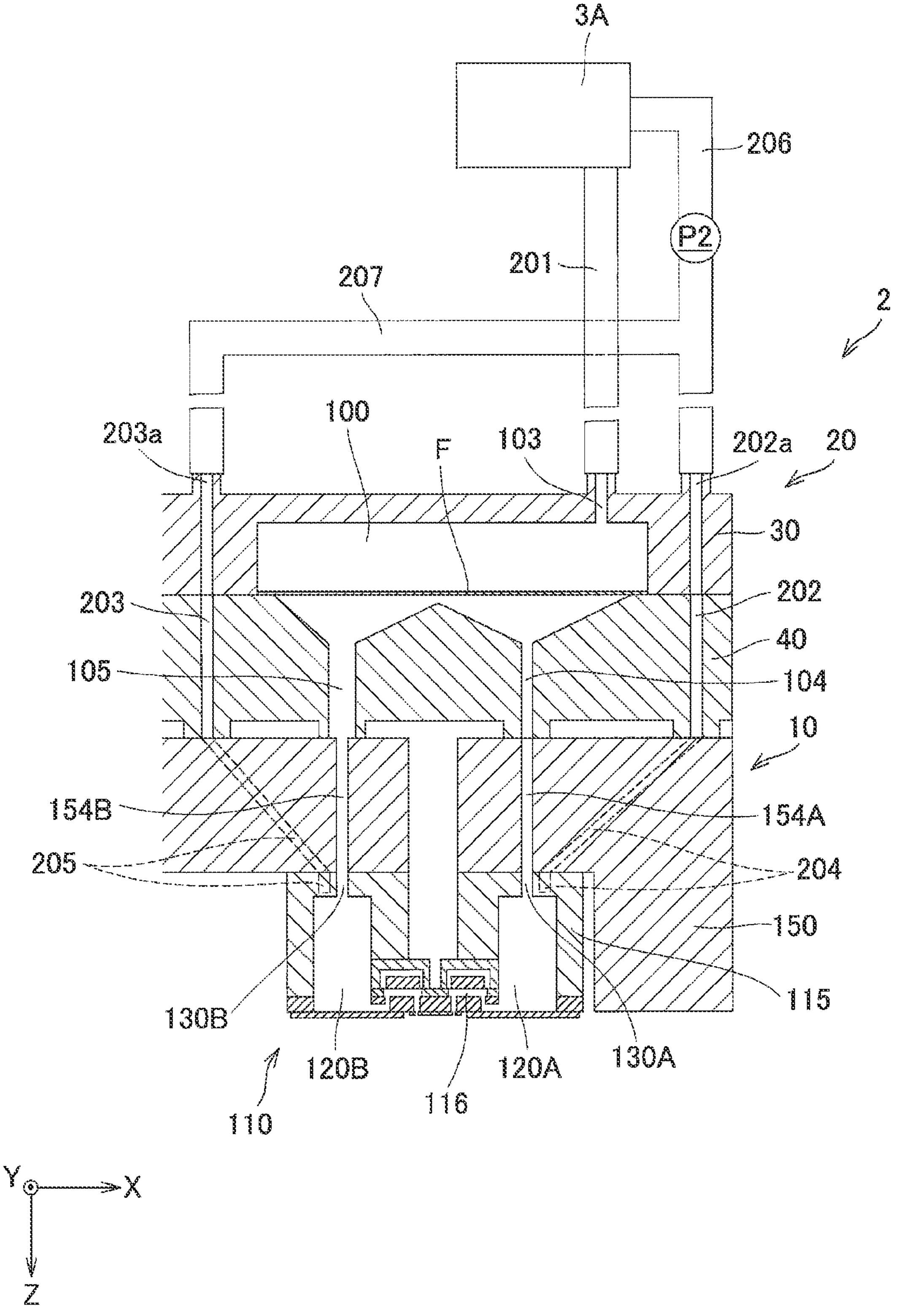
FIG. 11 is a view for explaining an example of a passage for ink circulation of a recording head.

Here, an example of a passage for ink circulation in the recording head 2 that performs circulation cleaning will be described. FIG. 11 is a view for explaining a passage for ink circulation of the recording head 2 and is a view simplifying and illustrating the recording head.

In the recording head 2 illustrated in FIG. 11, the inflow passage 103 of the filter unit 20 is coupled to an ink tank 3A, which is a liquid storage, by a supply tube 201. The filter chamber 100 in communication with the inflow passage 103 is coupled to a manifold 120A through the first outflow passage 104, the coupling passage 154A, and the introduction passage 130A in the same manner as the above-described embodiment. In addition, the filter chamber 100 is coupled to a manifold 120B through the second outflow passage 105, the coupling passage 154B, and the introduction passage 130B.

In addition, in the filter unit 20, a first discharge communication passage 202 and a second discharge communication passage 203 are provided to discharge ink from the head main body 110. When the recording head 2 includes a plurality of the head main bodies 110, the first discharge communication passage 202 and the second discharge communication passage 203 corresponding to each head main body 110 are provided. In addition, the case member 115 and the holding member 150 that form the liquid ejecting unit 10 are provided with a first outlet passage 204 that couples the manifold 120A to the first discharge communication passage 202 and a second outlet passage 205 that couples the manifold 120B to the second discharge communication passage 203.

Here, the first discharge communication passage 202 is in communication with the outside through a coupling port 202*a* without passing through the filter chamber 100. In addition, the second discharge communication passage 203 is also in communication with the outside through a coupling port 203*a* without passing through the filter chamber 100. A first discharge tube 206 leading to the ink tank 3A is coupled to the coupling port 202*a* of the first discharge communication passage 202. That is, the first discharge communication passage 202 is coupled to the ink tank 3A through the first discharge tube 206. A second discharge tube 207 is coupled to the coupling port 203*a* of the second discharge communication passage 203, and the second discharge tube 207 joins a midway portion of the first discharge tube 206. A pump P2 serving as a power source for circulating ink is provided upstream of the portion where the first discharge tube 206 joins the second discharge tube 207.

When circulation cleaning is performed in the recording head 2 illustrated in FIG. 11, ink supplied from the ink tank 3A to the manifold 120A through the filter chamber 100 is returned to the ink tank 3A by the pump P2 through the first outlet passage 204, the first discharge communication passage 202, and the first discharge tube 206 without passing through the filter chamber 100, such that the ink circulates. In the same manner, ink supplied from the ink tank 3A to the manifold 120B through the filter chamber 100 is returned to the ink tank 3A by the pump P2 through the second outlet passage 205, the second discharge communication passage 203, the second discharge tube 207, and the first discharge tube 206 without passing through the filter chamber 100, such that the ink circulates.

Even when such circulation cleaning is performed, according to the present disclosure, bubbles in the filter chamber 100 can be appropriately discharged. That is, the bubbles in the filter chamber 100 can be discharged downstream of the filter chamber 100 and moved to the ink tank 3A through the manifolds 120A and 120B. In addition, an effect of reducing the cleaning time can also be obtained.

Note that in the example of FIG. 11, the first discharge tube 206 and the second discharge tube 207 are joined together, but instead, the first discharge communication passage 202 and the second discharge communication passage 203 may be joined together in the filter unit 20. In this case, the second discharge tube 207 is unnecessary. Alternatively, the first outlet passage 204 and the second outlet passage 205 may be joined together in the head main body 110. In this case, the second discharge communication passage 203 and the second discharge tube 207 are unnecessary.

Moreover, in this example, the ink supplied from the ink tank 3A to the manifold 120A through the filter chamber 100 is returned to the ink tank 3A through the first outlet passage 204, the first discharge communication passage 202, and the first discharge tube 206 without passing through the filter chamber 100, such that the ink circulates, but the configuration of the passage for ink circulation is not limited thereto. The passage for ink circulation may be configured, for example, such that the ink supplied to the manifold 120A is returned to the ink tank 3A further through the pressure chamber 116.

In addition, in the ink jet recording apparatus 1 described above, the recording head 2 that is mounted on the transporting body 6*a* and moves in a main scanning direction is exemplified, but the configuration of the recording apparatus 1 is not limited thereto. The recording apparatus 1 may have a configuration in which, for example, the recording head 2 is fixed, and printing is performed only by moving the medium S in a sub-scanning direction. That is, the present disclosure can be applied to a so-called line type recording apparatus.

Moreover, the present disclosure is widely applicable to all the liquid ejecting heads and is also applicable to, for example, a recording head such as various types of ink jet recording head used for an image recording apparatus such as a printer, a color material ejecting head used for manufacturing a color filter of a liquid crystal display and the like, an electrode material ejecting head used for electrode formation of an organic electroluminescent (EL) display, a field emission display (FED), and the like, a bioorganic material ejecting head used for biochip manufacturing, and the like.

In addition, the present disclosure is also applicable to a liquid ejecting apparatus including other liquid ejecting heads as described above. In addition, the present disclosure is widely applicable to all the filter units and is also applicable to a filter unit used for a device other than a liquid ejecting apparatus and a liquid ejecting head.

What is claimed is:

1. A filter unit comprising:
- a filter through which a liquid passes;
- a filter chamber that is divided into an upstream chamber and a downstream chamber by the filter;
- an inflow passage through which a liquid flows into the upstream chamber;
- a first outflow passage through which a liquid flows out from the downstream chamber;
- a second outflow passage through which a liquid flows out from the downstream chamber; and
- a third outflow passage through which a liquid flows out from the downstream chamber, wherein
- a distance from the inflow passage to the first outflow passage is shorter than a distance from the inflow passage to the second outflow passage,
- a passage resistance of the second outflow passage is lower than a passage resistance of the first outflow passage,
- the distance from the inflow passage to the second outflow passage is shorter than a distance from the inflow passage to the third outflow passage, and
- a passage resistance of the third outflow passage is lower than the passage resistance of the second outflow passage.

2. The filter unit according to claim 1, wherein an area of an opening of the second outflow passage formed in the downstream chamber is larger than an area of an opening of the first outflow passage formed in the downstream chamber.

3. The filter unit according to claim 1, wherein
- a number of openings of the second outflow passage formed in the downstream chamber is greater than a number of openings of the first outflow passage formed in the downstream chamber.

4. The filter unit according to claim 3, wherein
- a distance from the inflow passage to each opening of the second outflow passage is same.

5. The filter unit according to claim 3, wherein
- the second outflow passage has branch passages that open in the downstream chamber and a joining passage where the branch passages join together.

6. The filter unit according to claim 1, wherein
- the first outflow passage is disposed between the inflow passage and the second outflow passage in a flow direction in which a liquid flows from the inflow passage to the second outflow passage.

7. A liquid ejecting head comprising:
- the filter unit according to claim 1; and
- nozzles configured to eject a liquid supplied from the filter unit.

8. The liquid ejecting head according to claim 7, further comprising
- a liquid ejecting unit having a first nozzle line formed of a part of the nozzles and a second nozzle line formed of a part of the nozzles, the second nozzle line being different from the first nozzle line, wherein
- a liquid is supplied to the first nozzle line from the downstream chamber through the first outflow passage, and a liquid is supplied to the second nozzle line from the downstream chamber through the second outflow passage.

9. A liquid ejecting apparatus comprising:

the liquid ejecting head according to claim 7; and a liquid storage for supplying a liquid to the filter unit.

10. The liquid ejecting apparatus according to claim 9, wherein a direction in which the filter extends is substantially parallel to a horizontal plane.

11. A filter unit comprising:

a filter through which a liquid passes;

a filter chamber that is divided into an upstream chamber and a downstream chamber by the filter;

an inflow passage through which a liquid flows into the upstream chamber;

a first outflow passage through which a liquid flows out from the downstream chamber;

a second outflow passage through which a liquid flows out from the downstream chamber; and a third outflow passage through which a liquid flows out from the downstream chamber, wherein a distance from the inflow passage to the first outflow passage is shorter than a distance from the inflow passage to the second outflow passage, an area of an opening of the second outflow passage formed in the downstream chamber is larger than an area of an opening of the first outflow passage formed in the downstream chamber, a diameter of the opening of the second outflow passage is equal to or more than 1 mm and equal to or less than 2 mm, and a diameter of the opening of the first outflow passage is equal to or more than 0.5 mm and less than 1 mm.

12. The filter unit according to claim 11, wherein a length of the first outflow passage is same as a length of the second outflow passage.

13. The filter unit according to claim 11, further comprising a third outflow passage through which a liquid flows out from the downstream chamber, wherein the distance from the inflow passage to the second outflow passage is shorter than a distance from the inflow passage to the third outflow passage, and a size of an opening of the third outflow passage formed in the downstream chamber is larger than a size of the opening of the second outflow passage.

14. A liquid ejecting head comprising:

the filter unit according to claim 11; and nozzles configured to eject a liquid supplied from the filter unit.

15. A liquid ejecting apparatus comprising:

the liquid ejecting head according to claim 14; and a liquid storage for supplying a liquid to the filter unit.

16. A filter unit comprising:

a filter through which a liquid passes;

a filter chamber that is divided into an upstream chamber and a downstream chamber by the filter;

an inflow passage through which a liquid flows into the upstream chamber;

a first outflow passage through which a liquid flows out from the downstream chamber; and a second outflow passage through which a liquid flows out from the downstream chamber, wherein a distance from the inflow passage to the first outflow passage is shorter than a distance from the inflow passage to the second outflow passage, and a passage resistance of the second outflow passage is lower than a passage resistance of the first outflow passage an opening of the first outflow passage formed in the downstream chamber is disposed between an opening of the inflow passage formed in the upstream chamber and an opening of the second outflow passage formed in the downstream chamber in a flow direction in which a liquid flows from the inflow passage to the second outflow passage when viewed in a direction perpendicular to the filter.

17. A liquid ejecting head comprising:

the filter unit according to claim 16; and nozzles configured to eject a liquid supplied from the filter unit.

18. A liquid ejecting apparatus comprising:

the liquid ejecting head according to claim 17; and a liquid storage for supplying a liquid to the filter unit.

* * * * *